W. J. STEVENSON, P. A. FUCHS & W. HIECKE, Jr.
SEWER CLEANER.
APPLICATION FILED OCT. 14, 1912.

1,163,624.

Patented Dec. 7, 1915.
2 SHEETS—SHEET 2.

UNITED STATES PATENT OFFICE.

WILLIAM J. STEVENSON, PHILIP A. FUCHS, AND WILLIAM HIECKE, JR., OF MILWAUKEE, WISCONSIN; SAID FUCHS ASSIGNOR OF ONE-TWELFTH OF THE WHOLE RIGHT AND SAID HIECKE ASSIGNOR OF ONE-TWELFTH OF THE WHOLE RIGHT TO SAID STEVENSON.

SEWER-CLEANER.

1,163,624.      Specification of Letters Patent.      Patented Dec. 7, 1915.

Application filed October 14, 1912. Serial No. 725,565.

*To all whom it may concern:*

Be it known that we, WILLIAM J. STEVENSON, PHILIP A. FUCHS, and WILLIAM HIECKE, Jr., citizens of the United States, residing at Milwaukee, county of Milwaukee, and State of Wisconsin, have invented new and useful Improvements in Sewer-Cleaners, of which the following is a specification.

Our invention relates to improvements in sewer cleaners.

The object of our invention is to provide improved means for removing the grease and other material which accumulates upon the walls of sewers.

Figure 1:
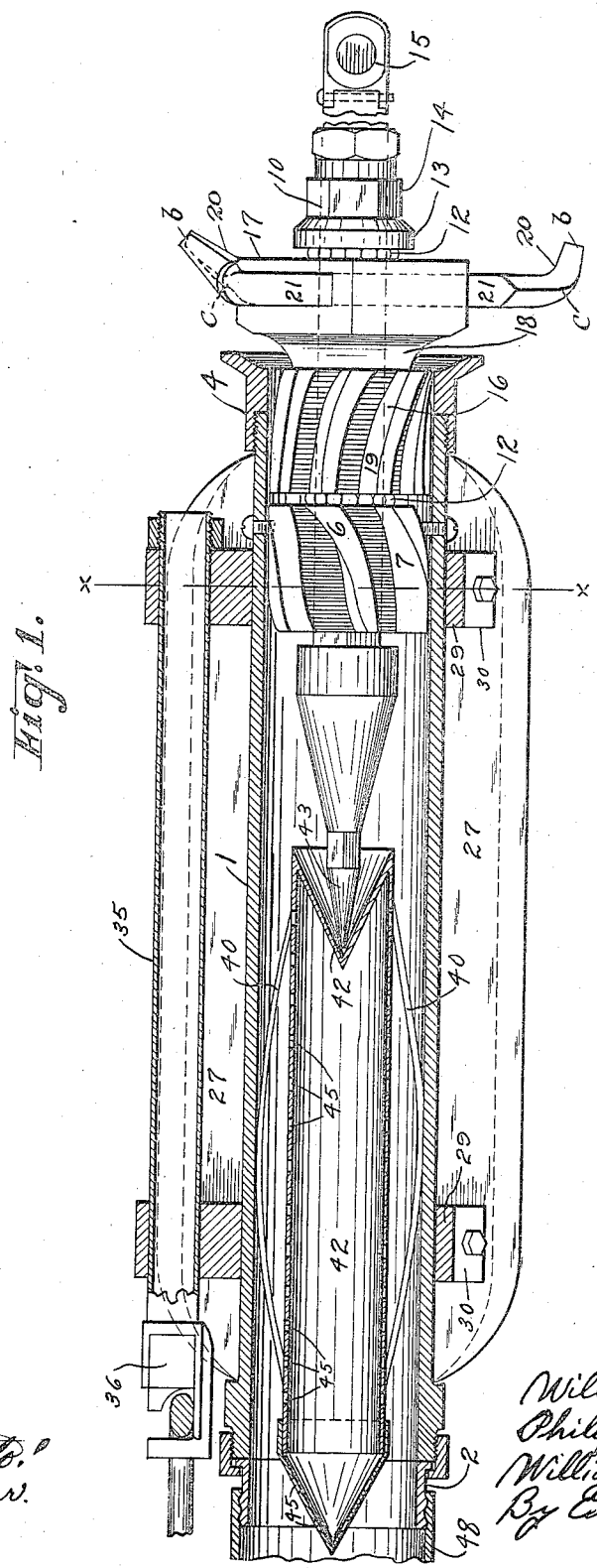
Figure 2:
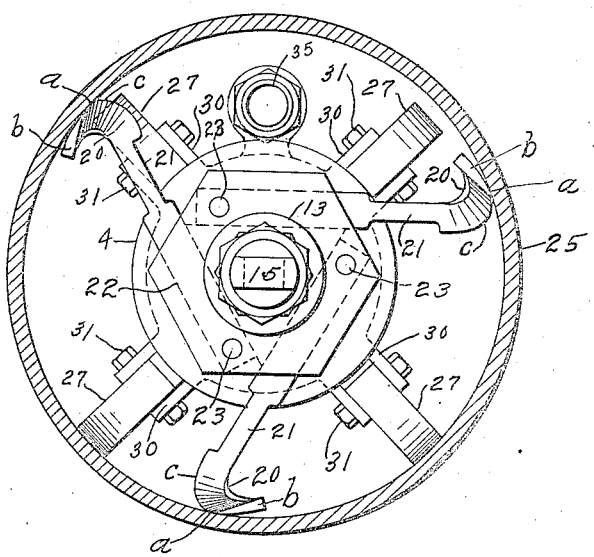
Figure 3:
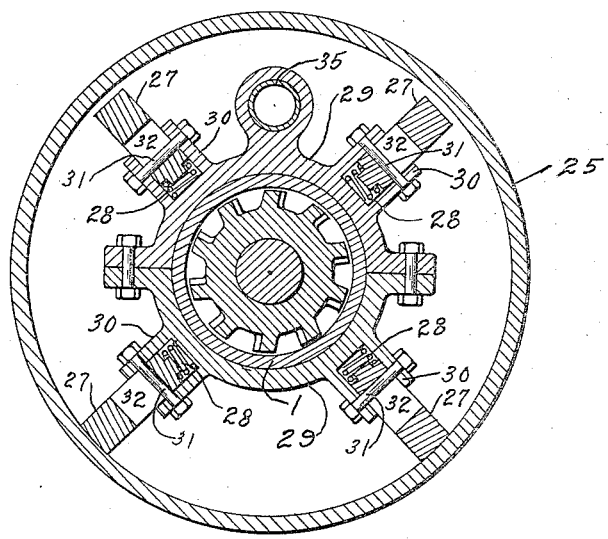

In the drawings Figure 1 is a longitudinal sectional view of a sewer cleaner embodying our invention. Fig. 2 is a front view showing the device in position for use with a sewer pipe which is illustrated in cross section. Fig. 3 is a cross sectional view, drawn on line $x$—$x$ of Fig. 1.

Like parts are identified by the same reference characters throughout the several views.

A cylinder 1 is provided at one end with a coupling 2 adapted to receive an ordinary hose coupling. At its other end the cylinder 1 is provided with a flared member 4, the purpose of which will be hereinafter explained. A water actuated motor is mounted in the cylinder 1 at the flared end thereof. This includes a stationary member 6 which fills the cylinder, but has water directing, curved grooves 7 in its periphery. The cylinder wall, with the walls of the grooves 7, form closed ducts. A shaft 10 extends through the member 6 or is formed integrally therewith, and an impact motor or turbine rotor is mounted upon this shaft with antifriction thrust bearings 12 between it and the member 6 and also between the rotor and a shaft collar 13 adjustably held in position by a nut 14. The front end of the shaft 10 is provided with an eye piece 15 to facilitate the attachment of a cable, whereby the device may be drawn through a sewer.

The rotor comprises a bucket grooved member 16 and a head 17 connected by a neck piece 18, the latter being conically enlarged in the direction of the head along outwardly curving lines. The member 16 is provided with bucket flanges 19 formed by grooving the periphery of said member, and the cylinder 1 forms an outer wall, whereby the grooves constitute ducts when the parts are assembled. Water delivered to these bucket grooves is discharged against the outwardly curving sides of the neck piece 18, which deflects the water and delivers it between the neck and the flaring member 4, in a conical sheet.

Cutting knives are secured to the head piece 17. These knives are formed with forwardly curved blades 20 and shanks 21, the latter being inserted in sockets 22 in the head and secured by set screws 23. The blades are formed with sharp edges shaped to fit along the interior wall of a sewer 25 as shown at $a$ in Fig. 2. The extremities of the blades are inwardly turned as shown at $b$, that is to say, the blade of each knife lies at an angle with the body of the shank by which it is carried, and the outer portion of the blade extends substantially along a helical curve following the interior surface of the sewer wall, said blade being connected to the shank by a portion rearwardly curved from the shank toward the extremity with relation to the direction of rotation of the blade, and forwardly directed from the shank toward the extremity with relation to the line of travel of the structure. The blades have thick backs, and their inner faces are beveled abruptly from the backs to the cutting edges as illustrated at C. We have discovered that this form of blade is very effective in not only cutting the grease from the sewer wall but in causing it to break up into fragments, the curved form of the blade, and the fact that it is inclined or angularly positioned with reference to the plane of rotation, causing it to cut with a shearing action and also to break up the released portions. The form of the flaring member 4 and neck piece 18 is such as to direct water from the bucket grooves directly against these blades and against the walls of the sewer where the cutting operation is being performed, thus facilitating the removal of the loosened material.

A set of runners 27 are resiliently supported from the walls of cylinder 1 by coiled springs 28. The springs 28 are socketed in connecting members 29, which are clamped around the cylinder and which are provided with outwardly projecting guide arms 30 from which cross pins 31 extend through slots 32 in the runners. Between these runners a tubular brace rod 35 extends, this being connected with the members 29 and provided at its rear end with a coupling member 36 adapted to permit the manipulation of a counterpart member into coupling position therein to facilitate the attachment of a retracting cable or of jointed forcing bar (not shown) employed for pushing the device through the sewer if clogged to such an extent that a cable cannot be passed through it.

A cage 42 for disinfecting material is removably supported in the cylinder 1 by curved wire bows 40, the ends of which are secured to the cage. At its rear end the cage is tapered and it is provided with apertures 45 in the tapered portion and in its side walls, permitting water circulation. At its forward end the cage is provided with a socket 41, and a rearwardly tapered member 43, carried by shaft 10, fits into this socket and receives the forward thrust of the cage under water pressure. The member 43 also directs the water into the grooves 7, its forward end being of sufficient diameter to prevent the water from striking the solid central portion of member 6 and forming eddy currents.

In operation, the device is coupled at its rear end to a hose 48. A cable is passed through a section of the sewer, i. e. from one manhole to the next, and connected to the rod 10 at the eye 15. Where the cable cannot be used, push rods may be engaged with coupling 36 and the device pushed through the sewer while performing the cleaning operation. In either case water under pressure is delivered through the hose, and the device is drawn (or pushed) through the sewer, preferably in the direction of the outlet. The water is directed by the ducts 7 against the bucket flanges 19 of the rotor, whereby the latter is rapidly revolved and the deposit cut from the walls of the sewer and broken up by the blades 20. Owing to the peculiar form of the blades they cut and plow the material from the walls, breaking it up and throwing it forwardly. The water discharging from the bucket grooves of the rotor is delivered outwardly as above explained, and clears away the loosened material, carrying it ahead of the machine where the sewer is not wholly clogged. When the disinfecting cage 42 is employed, the water may be charged with a disinfecting solvent, which causes the grease to disintegrate. This may, however, be omitted if desired.

Our device is adapted for use in sewers of different sizes, since the blades and also the runners may be removed and replaced by others of greater or less radial extension. The blades may also be removed when dull or damaged and sharp edged blades substituted.

We attach great importance to the form of the blades and their angular position with reference to the plane of rotation, since experiments have demonstrated that these blades are very effective in cutting out roots and in breaking up the material as fast as it is cut from the sewer walls instead of delivering it in strips or permitting it to clog between the knives.

The greasy mass which collects on the walls of sewers clogs all ordinary forms of tube cleaners, and frequently clogs the sewer itself in front of the cleaning machines to such an extent as to render further progress impossible. This is due to the cohesion of the mass and its sticky character whereby ordinary knives pass through without removing it, and the spaces between ordinary scrapers fill to the outer margins of the blades thus clogging them. But our experiments have demonstrated that with blades which have an abrupt bevel and a shearing action, and which are arranged to throw the material forwardly this material may be effectively cut away, broken up, and scattered so that it will be carried away by the water as fast as it is removed.

We claim:

1. In a sewer cleaner, the combination with a rotary member, of a plow secured thereto, comprising a supporting shank projecting radially from the rotary member and having on its outer end a rigid curved blade extending forwardly with reference to the axial line of travel of the rotary member and trailing from the shank with relation to its line of rotary motion, together with means for drawing said rotary member through a sewer, and a motor for imparting rapid rotative movements thereto.

2. In a sewer cleaner, the combination with a rotary member, of a plowing knife secured thereto, comprising a supporting shank projecting radially from the rotary member and having on its outer end a rigid curved blade extending forwardly with reference to the axial line of travel of the rotary plow member and trailing therefrom with relation to its line of rotary motion, said blade having a sharp edge and a thick back and formed with its inner face beveled abruptly from the back to said edge, together with means for drawing said rotary member through a sewer, and means for rotating said member during its progressive movement along the sewer wall.

3. A sewer cleaner including the combination of a water driven rotary member and a set of curved blades carried by said member, each of said blades having its outer portion extending in curved lines forwardly in the direction of travel of the cleaner and rearwardly with reference to the direction of rotation and provided with inturned extremities adapted to move with a plowing action through material adhering to the walls of a sewer, said water driven member being provided with an integral forwardly and outwardly curved neck piece between the water receiving portion and the blades and adapted to direct the water outwardly against the inner faces of the blades and against the walls of the sewer.

4. In a sewer cleaner, the combination with a rotary member, a shank supported therefrom and a blade carried by said shank, said blade being curved forwardly with relation to the direction of travel of the cleaner and rearwardly with relation to the direction of rotation of the blade, the cutting portion of said blade extending substantially along a helically curved line adjacent to the wall of the sewer to be cleaned.

5. In a sewer cleaner, the combination with a rotary member, a shank supported therefrom and a blade carried by said shank, said blade being curved forwardly with relation to the direction of travel of the cleaner and rearwardly with relation to the direction of rotation of the blade, the cutting portion of said blade extending substantially along a helically curved line following the wall of the sewer to be cleaned, said blade being of chisel formation in cross section.

6. A sewer cleaner comprising in combination with a body portion adapted to be drawn through a sewer, of a rotary head carried thereby, a motor carried by said body portion and adapted to impart rapid rotation to said head and a rigid cutting blade carried by said head, said blade being so shaped as to constitute a portion of a helix.

7. In a device of the character described the combination with a body portion adapted to be drawn through a sewer of a rotary head carried thereby, means carried by said body portion for rotating said head and a plurality of blades carried by said head each of said blades being so shaped as to constitute a part of a helix and each of said blades comprising an outer cutting edge, a portion of which when in use lies in contact with the sewer wall and an inner edge, disposed when in use out of contact with the sewer wall whereby a plowing action is secured.

In testimony whereof we affix our signatures in the presence of two witnesses.

WILLIAM J. STEVENSON.
PHILIP A. FUCHS.
WILLIAM HIECKE, Jr.

Witnesses:
    LEVERETT C. WHEELER,
    IRMA D. BREMER.